United States Patent [19]

Doherty, Jr.

[11] Patent Number: 4,564,226
[45] Date of Patent: Jan. 14, 1986

[54] SYSTEM AND METHOD FOR INCREASING WALL THICKNESS ON END OF PIPE ON WHICH THREAD IS TO BE FABRICATED

[75] Inventor: Alfred E. Doherty, Jr., Fort Worth, Tex.

[73] Assignee: Explosive Research Ltd., Fort Worth, Tex.

[21] Appl. No.: 317,330

[22] Filed: Nov. 2, 1981

[51] Int. Cl.$^4$ .............................................. F16L 25/00
[52] U.S. Cl. .................................... 285/334; 285/382; 285/383; 285/390; 285/392; 29/421 E; 72/56; 228/107
[58] Field of Search ............... 285/333, 334, 355, 390, 285/383, 382, 381, 382.2, 392; 29/421 E, 421 M, 421 R, 507, 508, 521, 522; 228/107, 108, 109, 2.5, 3.1; 72/56; 403/274, 284, 343; 411/900–902

[56] References Cited

U.S. PATENT DOCUMENTS

| | | | |
|---|---|---|---|
| 273,591 | 3/1883 | Patterson | 285/392 |
| 609,030 | 8/1898 | Keller | 285/392 X |
| 1,236,145 | 8/1917 | Burns | 285/390 X |
| 1,577,591 | 3/1926 | Rieger . | |
| 2,480,034 | 8/1949 | Lapp | 285/392 X |
| 3,264,731 | 8/1966 | Chudzik | 29/421 E X |
| 3,358,349 | 12/1967 | Rosen | 29/421 E |
| 3,364,561 | 1/1968 | Barrington | 29/421 E |
| 3,376,633 | 4/1968 | Wesley | 29/421 E |
| 3,434,194 | 3/1969 | Whittaker et al. | 29/421 E |
| 3,535,767 | 10/1965 | Doherty, Jr. | 29/470.1 |
| 4,085,951 | 4/1978 | Morris | 285/355 X |

Primary Examiner—Dave W. Arola
Attorney, Agent, or Firm—Hubbard, Thurman, Turner & Tucker

[57] ABSTRACT

A system and method for thickening the end of a pipe or rod for receiving tapered threads is disclosed. A metal sleeve is metallurgically bonded to the outer surface of the end portion of a well pipe by a high-energy impact of the sleeve colliding radially inward against the end of the well pipe. The impact is produced by the detonation of an explosive charge propagating uniformly around the sleeve. A castable metal having a substantially lower melting temperature than the melting temperature of the pipe is deposited within the pipe and is permitted to solidify in situ to form a core for absorbing the high-energy impact of the collision and for limiting the radial contraction of the pipe in order to preserve its inside diameter. A thread is machined along a tapered path which penetrates the metallurgically bonded interface of the sleeve and pipe.

14 Claims, 14 Drawing Figures

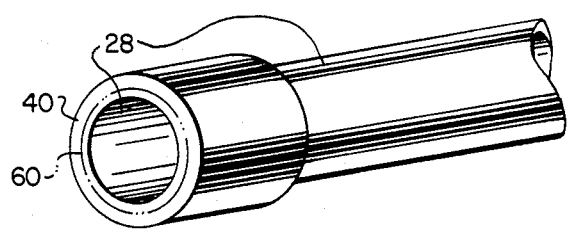
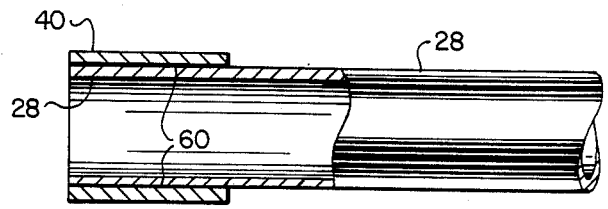
FIG. 6  FIG. 7
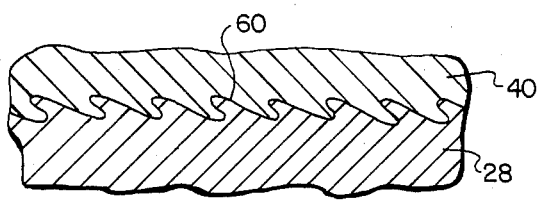
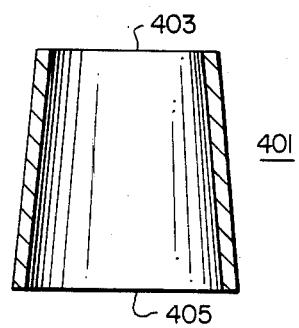
FIG. 8  FIG. 9
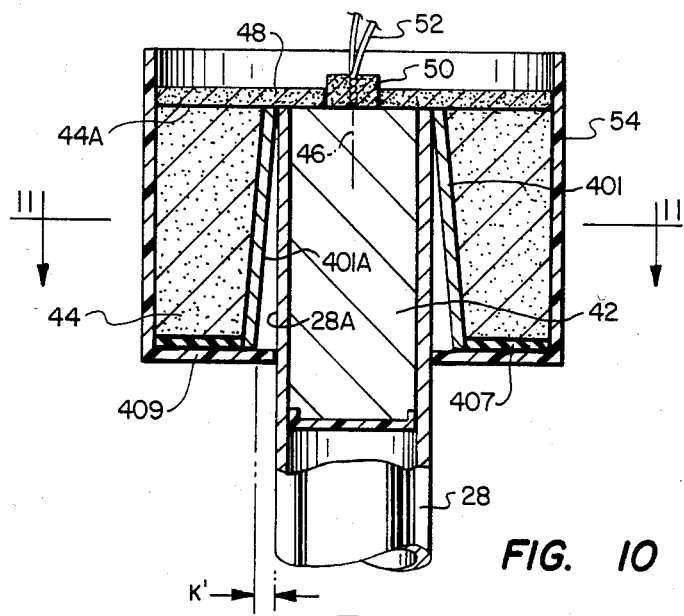
FIG. 10
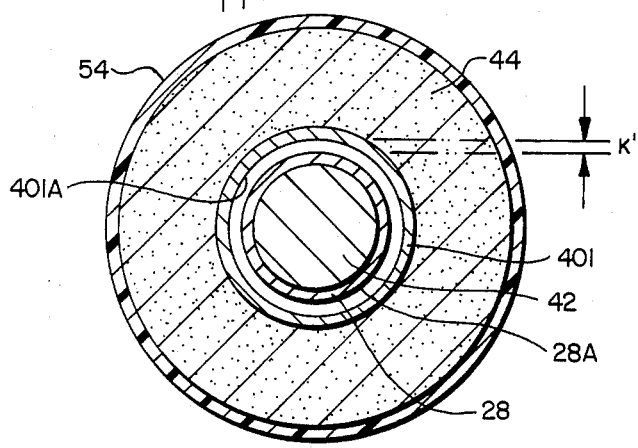
FIG. 11

4,564,226

SYSTEM AND METHOD FOR INCREASING WALL THICKNESS ON END OF PIPE ON WHICH THREAD IS TO BE FABRICATED

BACKGROUND OF THE INVENTION

1. Field of the Invention:

The present invention relates generally to the fabrication of well pipes which are utilized in the production of hydrocarbon fluids, and in particular, to a method and apparatus for fabricating threads on the connecting ends of such pipes.

2. Description of the Prior Art:

The production of hydrocarbon fluids such as oil and gas from deep earth strata present serious problems not encountered in shallower hydrocarbon producing wells. Well pipes, usually fabricated of ferrous metals, are commonly employed in connection with the drilling of such wells into the earth and in the production of fluids from the wells. Generally, the well pipes have lengths convenient for handling and carry threaded joints at their ends so that the lengths of the well pipe can be readily interconnected. The joints of well pipe may typically be from 20 to 35 feet in length and may be connected together to form pipe strings to reach the producing strata, which may be located at depths of from 10,000 to 20,000 feet.

The well pipe in very deep wells may be subjected to great fluid pressures and highly corrosive fluids. Thus, the joints between the well pipe sections in a pipe string must be able to contain such internal pressures and also the tensile stresses induced by the weight of the pipe string. The connections must be strong in tension, torsion, pressure resistance, and in handling strength so that the well pipe will perform under many special conditions. For example, drill tubing connections must be strong enough to be made up and broken repeatedly without failure. This requires that the burst and collapse strength of the threaded connection should be equal to or greater than the burst and collapse strength of the pipe body. Increased burst and collapse strength for the threaded connection has been provided by forming a mechanical "upset" on the end of the well pipe or tubing. The mechanical upset is formed during the fabrication of the pipe section by heating the pipe to a high temperature and compressing the pipe in a die by a compressive force which exceeds the yield strength of the pipe metal. This procedure provides an enlarged wall thickness on the end of the pipe in which connecting threads are machined. Another method of enlarging the wall thickness of a pipe to form threaded connections and the like is disclosed in U.S. Pat. No. 1,577,591, wherein tapered metal sleeves are welded to the inner and outer surfaces of a pipe and male and female tool joint members are formed therein.

The mechanically upset well pipe connection has been used successfully and has found wide acceptance in the industry, especially for well pipes constructed of conventional ferrous alloys. However, corrosion resistant alloy materials such as stainless steel have been used to fabricate the joints which are utilized in the lower portions of deep wells which produce highly corrosive fluids. Because of the difficulties and expense involved in forming a mechanical upset in those alloys, the use of a solid stainless steel system has been limited to a relatively small number of wells of high production capacity.

SUMMARY OF THE INVENTION

The present invention is directed to the use of a metal sleeve which is metallurgically bonded to the outer surface of an end portion of the well pipe to increase the wall thickness of the well pipe so that pin or box threads may be machined therein. The well pipe and sleeve may be formed of a corrosion resistant metal, such as an alloy of stainless steel which is difficult to upset by conventional mechanical means. The metallurgical bond is produced by the high-energy impact of the sleeve against the pipe end in response to the detonation of an explosive charge which propagates uniformly around the sleeve. The end portion of the well pipe which is to be metallurgically bonded is filled with a castable metal which is permitted to solidify to form a core for absorbing the high-energy impact of the collision and carrying away the shock waves produced by the collision to prevent space problems from occuring and for limiting the radial contraction of the well pipe to preserve its inside diameter. The castable metal preferably has a substantially lower melting temperature than the melting temperature of the well pipe so that it can be easily removed after the bonding step has been performed. A connecting thread is machined along a tapered path which penetrates the metallurgically bonded interface of the sleeve and the well pipe, so that the thread extends through a portion of the sleeve and also through a portion of the well pipe end. In one embodiment, the sleeve is cylindrical-shaped, while in another embodiment, the sleeve is in the shape of a truncated cone, the apex of which is disposed in abutting relationship with the well pipe to facilitate alignment therebetween.

The novel features which characterize the invention are defined by the appended claims. The foregoing and other objects, advantages and features of the invention will hereinafter appear, and for purposes of illustration but not of limitation, an exemplary embodiment of the invention is shown in the appended drawing.

BRIEF DESCRIPTION OF THE DRAWING

FIG. 6 is an isometric view of the end of a well pipe having a sleeve metallurgically bonded thereto;

FIG. 7 is a longitudinal sectional view of the well pipe assembly shown in FIG. 6 which illustrates the metallurgically bonded union of the sleeve to the well pipe;

FIG. 8 is a magnified sectional view of the metallurgically bonded seam at the interface of the sleeve and well pipe;

FIG. 9 is a longitudinal sectional view of a cone-shaped pipe sleeve;

FIG. 10 is a longitudinal sectional view of the cone-shaped sleeve assembled around the well pipe of FIG. 3 in combination with apparatus for forming a metallurgical bond between the sleeve and well pipe;

FIG. 11 is a sectional view taken along line 11—11 in FIG. 10; and

Figure 12:
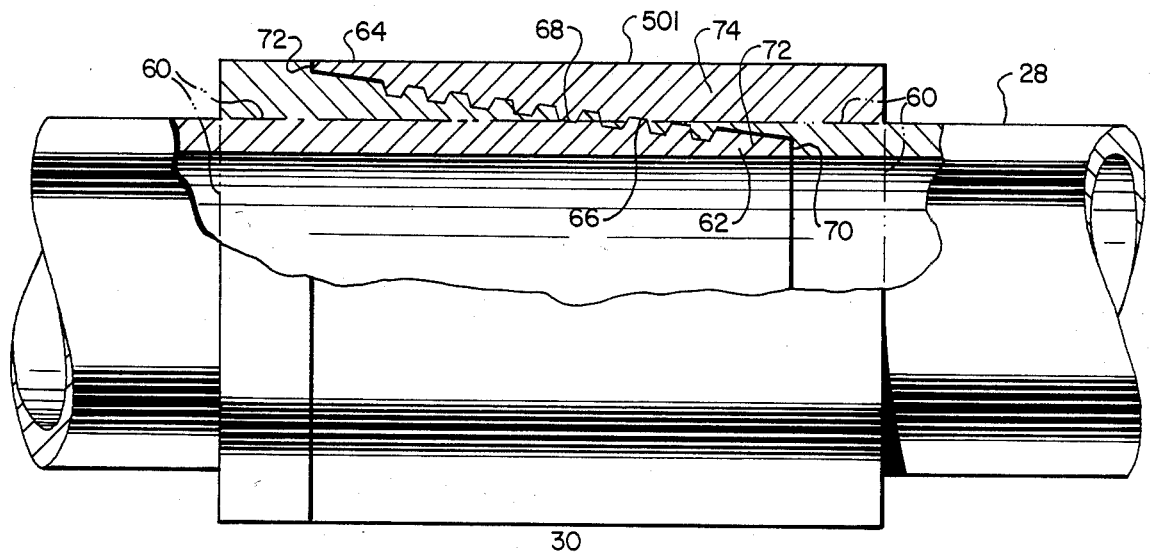
Figure 13:
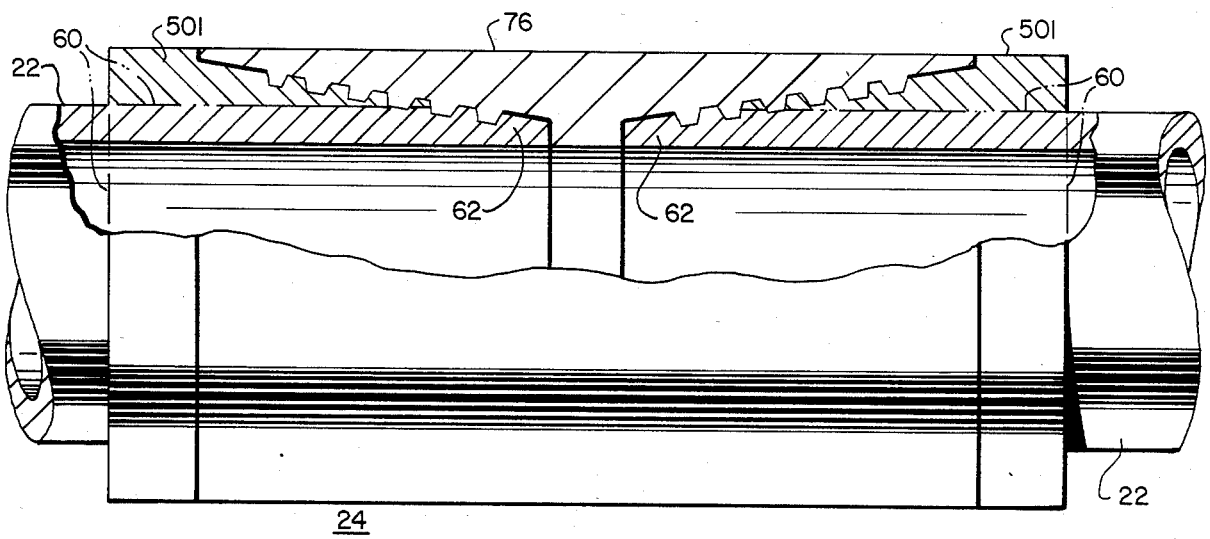
Figure 14:
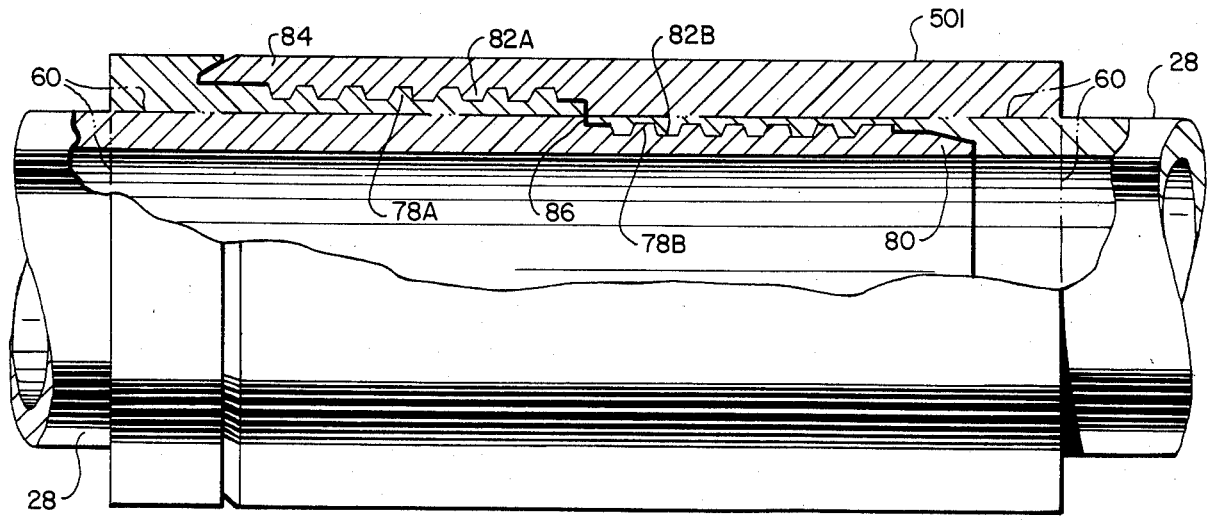

FIGS. 12, 13 and 14 are views, partially in elevation and partially in longitudinal cross section, of alternate embodiments of pin and box threaded connections which may be machined into a well pipe end portion which has been enlarged according to the teachings of the present invention.

DETAILED DESCRIPTION

Figure 1:
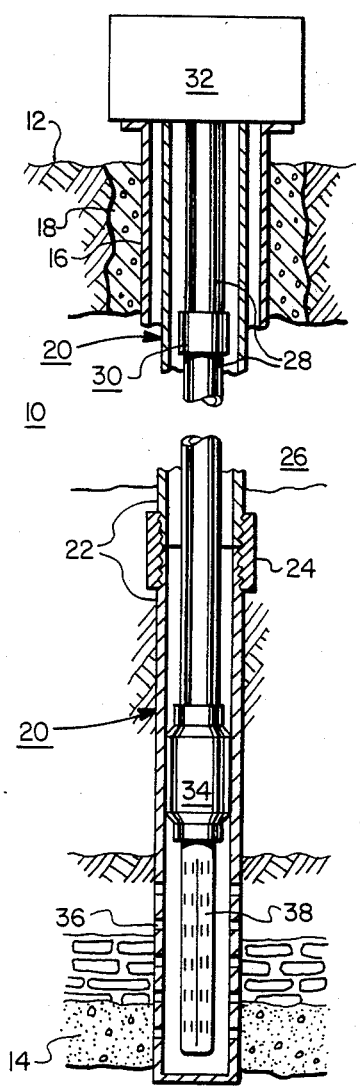
FIG. 1 is a schematic sectional view, partially broken away, representing a well system having a pipe joint fabricated according to the teachings of the present inventions.

Referring now to the drawing, and in particular to FIG. 1, a well system including a well pipe constructed in accordance with the present invention is indicated generally by the reference numeral 10. The well system includes a bore hole extending from the surface 12 of the earth to a producing strata 14 from which highly corrosive, relatively hot hydrocarbon fluids or the like are produced. The well system includes a surface casing string 16 which is typically run for a depth of several hundred feet to a few thousand feet and is set in place by surface cement 18. A primary casing string 20 extends typically from the surface to the bottom of the producing strata 14 and may be comprised of a plurality of joints of pipe 22 interconnected by threaded connections which are represented collectively at 24. A tubing string 26 comprised of a plurality of joints of pipe 28 is interconnected by a coupling 30 and is disposed within the producing casing 20 and extends from the surface to the deep producing strata 14. The joints of pipe and both the casing string 20 and the tubing string 26 may typically be from 20 to 35 feet in length, the total length of the string extending to the depth of the producing strata, which may be from 10,000 to 20,000 feet.

A suitable conventional surface control system, represented by the block 32 in FIG. 1, is provided to control production of fluid from the well. A conventional packer 34 may be connected in the tubing string 26 at a point above the producing strata 14. The packer 34 seals the annulus between the casing string 20 and the tubing string 26 above the packer from the same annulus below the packer. The production fluids enter the perforation 36 and the casing 20 and perforations 38 in the lower end of the tubing string 26 and normally flow inwardly through the tubing 26 as a result of down hole pressure. In some instances, a subsurface pump (not shown) may be employed at the bottom end of the tubing string. The annulus above the packer 34 may be filled with a non-corrosive fluid. Since the tubing string 26 is subjected to corrosive fluid from the formation 14, the joints 28 and coupling 30 of the tubing string are preferably formed from stainless steel or other suitable corrosion resistant metal which has sufficient tensile strength to support the weight of the tubing which is suspended from the surface structure and to contain any pressure differential.

Figure 2:
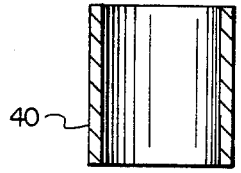
FIG. 2 is a longitudinal sectional view of a cylindrical pipe sleeve.
Figure 3:
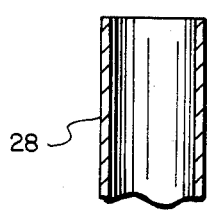
FIG. 3 is a longitudinal sectional view of a well pipe.

According to the teachings of the present invention, a cylindrical metal sleeve 40 (FIG. 2) is metallurgically bonded around an end portion of the tubing 28 (FIG. 3) to enlarge the wall thickness of the tubing to receive pin or box threads to form the coupling 30. The sleeve 40 is preferably fabricated of the same stainless steel alloy as the tube section 28.

Figure 4:
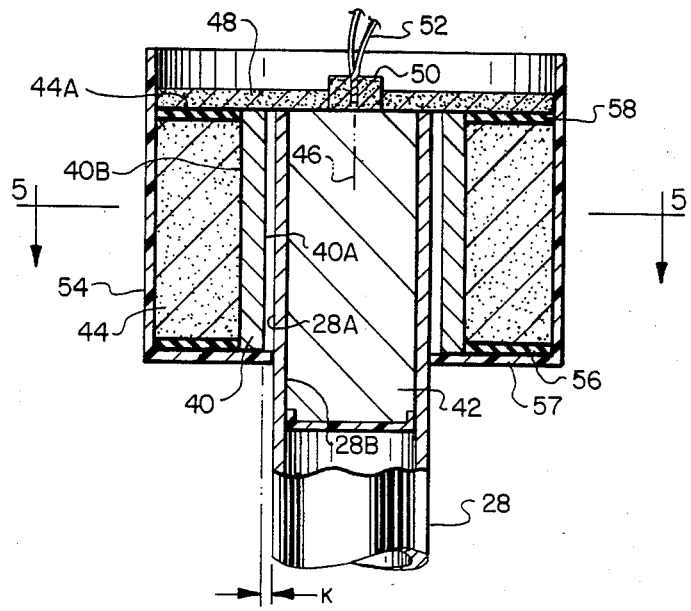
FIG. 4 is a longitudinal sectional view of the cylindrical sleeve assembled around the well pipe of FIG. 3 in combination with apparatus for forming a metallurgical bond between the sleeve and well pipe.
Figure 5:
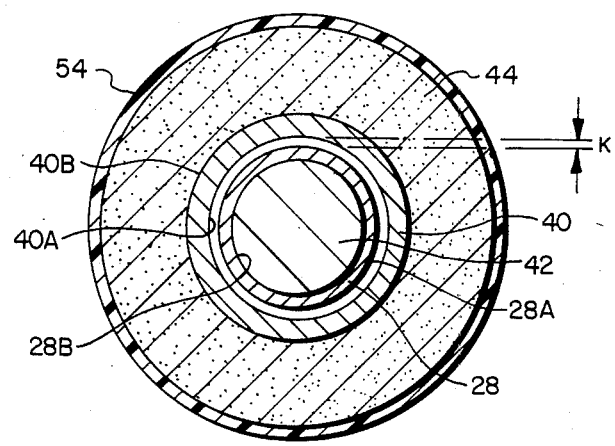
FIG. 5 is a sectional view taken along line 5—5 in FIG. 4.

The metallurgical bond of the sleeve 40 to the end of the tube 28 may be provided by using the apparatus shown in FIGS. 4 and 5. The sleeve 40 is supported in concentric alignment and in overlapping relation with the end portion of the tube 28 so that a substantially uniform stand-off distance K is established between the facing surfaces 40A of the sleeve 28A of the tubing. A core 42 is deposited in the end of the tube 28 by filling the end portion of the tube 28 with a castable metal such as lead or Cerro alloy. The liquid casting is permitted to solidify in place so that no voids or air spaces are formed between the core and the inside diameter surface 28B of the tube 28. It is important that the material of the core 42 have a substantially lower melting temperature than the melting temperature of the tube 28 so that it can be easily removed after the bonding procedure has been completed.

An explosive charge is disposed around the outside diameter surface 40B of the sleeve and extends substantially parallel to the axis 46 of the tube 28. In order to achieve uniform bonding of the sleeve 40 to the tube 28, the adjacent surfaces 40A and 28A should collide substantially simultaneously in any cross-sectional plane perpendicular to the axis 46, and the magnitude of the pressure generated by the collision should be substantially uniform throughout the collision region. For this reason, the explosive charge 44 is initiated substantially simultaneously at all points along its entire outside end surface 44A. A convenient way of producing the simultaneous detonation is to surface initiate the detonation at the annular end face 44A of the explosive charge 44. This is accomplished by a booster explosive charge 48 which is formed into a relatively thin circular disk and which has a detonation velocity substantially greater than the detonation velocity of the cylindrical explosive charge 44. The booster disk 48 is concentrically aligned with and is positioned in overlapping relation to the annular face 44A of the coterminal end of the explosive charge 44. A detonator 50 is concentrically disposed within the booster disk so that the detonation of the booster disk is initiated substantially at a point which is coincident with the axis 46 of the tube and sleeve. The detonator 50 is set off preferably by an electrical signal which is conducted through a pair of leads 52. In some cases it may be desirable to evacuate the air space between the sleeve 40 and the tube 28 prior to detonating explosive charge 44.

The explosive charge 44 is contained within an envelope 54 which may include annular spacers 56, 57 and 58. Spacer members 56 and 58 are disposed between the sleeve 40 and the envelope 54 to maintain the substantially uniform stand-off distance K. Spacer member 57, which may be formed as an integral part of envelope 54, extends between envelope 54 and tube 28 to provide axial support for sleeve 40 along axis 46 and to close off envelope 54 from the bottom. The stand-off distance K determines the impact angle of the colliding surfaces. This has an effect of the geometry of the metallurgically bonded seam 60 which is illustrated in detail in FIG. 8 of the drawing. The amplitude of the waves in the wavey interface of the metallurgical seam 60 increases as the impact angle increases. The impact angle increases generally as the ratio of explosive weight to sleeve weight increases and as the ratio of the stand-off distance K to the sleeve weight increases. Thus for a given sleeve, the impact angle can be increased by increasing the explosive loading of the explosive charge 44 or by increasing the stand-off distance K. The stand-off distance K, the impact angle and the amount and detonation velocity of explosive material 44 are selected according to the yield strengths, thickness and sonic velocities of the materials to be bonded. The explosion bonding of the sleeve 40 to the tube 28 is preferably carried out at a collision velocity which results in the production of relatively small amounts of solidified melt in the seam 60. Therefore an amount of explosive which gives good wavey bonding over the interface 60 of the sleeve and the tube is preferred.

The explosive charge 44 is cylindrical in shape and its inside diameter surface contacts the outside diameter surface 40B of the sleeve. For a given combination of sleeve material and tube material, the detonation velocity and explosive loading will normally be chosen to give a wavey metallurgical bond comprising, by area, at least about 70 percent and preferably at least about 90 percent direct metal-to-metal bonding, the remainder being periodically spaced regions of solidified melt that bond the parent metals and are separated from each other by the areas of such direct bonding. Any explosive which has the requisite detonation velocity may be used, and solid, liquid, as well as semi-solid and gel explosives are suitable. For loading into the container 54, a readily pourable gel composition, or a free-flowing granular composition is preferred.

The explosive charge 44 is introduced into the container 54 and is packed to a density to provide the desired loading and a detonation velocity in the desired range. The thin circular booster disk 48 is then placed in contact with the outer annular face of the cylindrical charge 44 and the detonator 50 is affixed to the center of the booster disk 48. Detonation of the booster disk 48 by actuation of the detontor 50 initiates an explosion which progresses radially outwardly from the center of the disk 48 at a velocity which greatly exceeds the detonation velocity of the cylindrical charge 44. The annular face 44A of the cylindrical charge 44 is surface initiated along all points around the coterminal end of the cylindrical charge substantially simultaneously as the detonation of the booster disk progresses radially outwardly. Because the detonation velocity of the booster disk 48 is much greater than the detonation velocity of the cylindrical charge 44, the initiation of the detonation of the cylindrical charge 44 occurs substantially uniformly across its annular face 44A. As the detonation of the cylindrical charge 44 occurs, that detonation progresses substantially uniformly around the surface of the sleeve 40 and substantially parallel to the axis 46 of the tube 28.

In another embodiment, cylindrical sleeve 40 is replaced by a metal sleeve 401 in the shape of a truncated cone (FIG. 9). The dimensions of sleeve 401 are chosen such that apex 403 of sleeve 401 has an inner diameter only slightly greater than the outer diameter of tube 28, so that inner surface 403A is in abutting relationship with outer surface 28A when sleeve 401 is assembled on tube 28 (FIGS. 10–11). Base 405 of sleeve 401 is supported in concentric alignment and overlapping relationship with tube 28 by a pair of thin annular spacer members 407 and 409. Spacer member 407 is positioned between sleeve 401 and envelope 54 to maintain a substantially uniform stand-off distance K' between inner surface 401A of sleeve 401 at the base 405 thereof and outer surface 28A of tube 28. Spacer member 409, which may be formed as an integral part of container 54, extends between container 54 and tube 28 to provide axial support for sleeve 401 along axis 46 and to close off container 54 from the bottom. Spacers members 407 and 409 are preferably formed by die cutting cardboard or other suitable material to the desired dimensions. Because apex 403 is in abutting relationship with tube 28, one end of sleeve 401 is essentially self-aligning, thereby eliminating the need to provide an additional spacer member and facilitating positioning of sleeve 401 with respect to tube 28.

As previously described, facing surfaces 401A and 28A should collide substantially simultaneously in any cross-sectional plane perpendicular to axis 46 to obtain uniform bonding between sleeve 401 and tube 28. Explosive charge 44 is disposed around the perimeter of sleeve 401 within container 54 and is packaged to achieve the desired density and load. Booster charge 48 is disposed in the form of a thin circular disk in concentric alignment and overlapping relation to annular face 44A of the coterminal end of explosive charge 44. Detonator 50 is concentrically disposed within booster charge 48 so that detonation of booster charge 48 will occur substantially coincident with axis 46.

Because of the greater velocity of the explosion within booster charge 48, detonation of booster charge 48 will detonate explosive charge 44 substantially simultaneously at all points on annular face 44A. The detonation of explosive charge 44 occurs substantially uniformly around the surface of sleeve 401 and progresses substantially parallel to axis 46.

Stand-off distance K' is chosen to ensure that a good wavey metallurgical bond is achieved along the entire interface 60 (FIG. 8). The greater the stand-off distance K', the greater the impact angle for a given explosive load and the greater the amplitude of the waves at bond interface 60. A good metallurgical bond can thus be achieved with less explosive material by increasing stand-off distance K'. In one embodiment, K' is approximately 0.254 inch. The separation between sleeve 401 and tube 28 decreases in the direction of apex 403. The greater quantity of explosive charge 44 located around the periphery of apex 403 compensates for the smaller separation, so that a good wavey metallurgical bond is provided along the entire length of interface 60.

Various combinations of metals and alloys may comprise the tube 28 and sleeves 40 and 401 for oil production purposes or other applications. For example, combinations of metals such as aluminum to steel and titanium to steel, both of which form brittle intermetallics when exposed to the elevated temperatures of conventional welding methods, are readily joined by the explosion bonding process. The only metals that cannot be metallurgically bonded satisfactorily by the method described herein are those which are too brittle to withstand the impact of the explosive impulse. Generally, those metals with 5 percent or greater tensile elongation in a two-inch gauge length and having a Charpy V-notch impact resistance of ten foot-pounds, or greater, are acceptable.

A thread is machined into the composite end portion of the tube 28 to form either a pin 62 or a box 64 as illustrated in FIGS. 12, 13 and 14. The pin member 62 has a thread 66 which interfits with a thread 68 which is carried on the box member 64. The threads 66 and 68 are engaged in threaded union to form the tube connection 30 which is exemplified as a tapered modified buttress style. The pin member 62 and the box member 64 carry abutting shoulders 70 and 72, respectively, providing a positive stop to limit the amount of coaxial engagement. The pin member 62, at the beginning of its thread 66, is provided with a tapered reduced diameter portion 72. The box member 64, at its inner end of its threads 68 and extending axially therefrom, carries a tapered increased diameter portion 74. The portions 72 and 74 reside opposite one another at least in part when the pin and box members are threadedly interconnected. The thread of each pin and box member follows a tapered path which penetrates the metallurgically bonded interface seam 60 formed between the tube 28 and the sleeve 501.

Other pin and box arrangements are illustrated in FIGS. 13 and 14 of the drawing. In particular, the casing connection 24 which is shown in elevation in FIG. 1 of the drawing, is illustrated in detail in FIG. 13. Critical well environments require the use of intermediate strength controlled yield steel grades for the construction of the casing strings 20. The casing string is subjected to extremely high pressures and therefore the connection 24 must be fabricated with high tensile efficiency, low hoop stress and pressure ratings, with collapse and burst ratings equal to the casing body 22. The connection 24 is made up by the union of opposing pin members 62 which are threadedly interconnected with a cylindrical collar 76 in which tapered threads have been machined.

An alternate embodiment of the connection 30 is shown in FIG. 14 and is represented by the reference numeral 30A. The connection 30A is defined by the union of a two-step thread 78A and 78B each of which extends substantially parallel to the axis of the tube 28 at first and second diameters. The thread 78A is machined into the metallurgically bonded sleeve at a relatively large diameter and the thread 78B is machined into the tube 28. The combination of the thread 78A and 78B define a two-step pin member 80. Corresponding threads 82A and 82B are machined at first and second diameters to define a box member 84 which is shown in threaded engagement with the pin member 80. The advantage of the two-step thread is well known in the industry and permits stabbing to take place on two separate threads simultaneously thereby creating a broad stable stabbed length, eliminating the possibility of cross-threading. A further advantage is the shoulder 86 which penetrates the metallurgically bonded seam 60 which provides an additional shoulder for bearing a very high compressive load.

Because the metallurgical bond of the invention is accomplished by explosive shock waves and the attendant very high pressures generated thereby, sleeves and well pipes or tubes of the same or dissimilar metals can be joined into an integral unit of great tensile strength which exceeds the tensile strength of a mill-upset connection formed by conventional upset procedures. Implementation of the invention can be accomplished without heavy or complex machinery. No specialized tooling is necessary to support the sleeve and tube. The core may be formed of any castable metal or other cohesive material which has a substantially lower melting temperature than that of the tubing or well pipe. Moreover, the explosives may be of the castable type which are formed into the appropriate cylindrical shape directly around the sleeve.

From the above detailed description of a preferred embodiment of the invention, it will be appreciated by those skilled in the art that an improved system and method for increasing the wall thickness on the end of a tubular member for the purpose of fabricating threads thereon have been described.

Although certain preferred embodiments of the invention have been described in detail, it should be understood that various changes, substitutions, or alterations can be made therein without departing from the spirit and scope of the invention as defined by the appended claims.

What is claimed is:

1. A well pipe comprising:
   a tubular metal body having an axial flow passage for conveying fluids;
   a metal sleeve coaxially disposed around an end portion of the tubular body having its inner surface metallurgically bonded to the outer surface of the tubular end portion by a high-energy impact of the sleeve against the tubular body; and
   a thread machined into the metallurgically bonded sleeve in first and second paths, each extending substantially parallel to the axis of the tubular member at first and second diameters, respectively, the thread extending along the first path being machined within the tubular member, and the thread extending along the second path being machined within the sleeve.

2. The well pipe as defined in claim 1, the thread extending along the first path being machined within the tubular member at a relatively small diameter beginning near the end of the tubular body and terminating at an interior point therein, and the thread extending along the second path being machined within the sleeve at a relatively larger diameter beginning near the terminating point of the first path and terminating at a point intermediate the ends of the sleeve, thereby defining a pin for engaging a box.

3. The well pipe as defined in claim 1, the thread extending along the second path being machined within the sleeve at a relatively large diameter beginning near the end of the sleeve and terminating at a point intermediate the ends of the sleeve, and the thread extending along the first path being machined within the tubular body at a relatively smaller diameter beginning near the terminating point of the first path and terminating at a point intermediate the ends of the tubular member, thereby defining a box for engaging a pin.

4. A method for forming a metallurgical bond between the outside diameter surface of a first metal cylinder and the inside diameter surface of a second metal cylinder comprising:
   depositing in the first metal cylinder within a portion of the cylinder to be bonded, a metal liquid casting of a cohesive metal having a substantially lower melting temperature than the melting temperature of the first metal cylinder and permitting the casting to solidify in situ to support the first metal cylinder portion adjacent to the casting;
   supporting the first metal cylinder inside of and in concentric alignment with the second metal cylinder so that a substantially uniformed standoff distance is established between the facing surfaces of the cylinders;
   partially evacuating the air in the standoff space between the two cylinders; and
   producing a progressive, high-energy collision of the second metal cylinder against the first metal cylinder, the inside diameter surface of the second metal cylinder being impacted against the outside diameter surface of the first metal cylinder at a velocity of sufficient magnitude to cause a formation of a metallurgical bond at the interface of the two metal cylinders whereby the liquid metal casting supports the portion of the first metal cylinder during the collision.

5. An apparatus for metallurgically bonding the inside surface of a truncated cone-shaped metal sleeve to the outside surface of a metal tube, comprising:

a filler material deposited in the metal tube within a portion of the tube to be bonded for supporting the portion of the tube during the bonding process;

means supporting the sleeve in overlapping relationship to the tube so that the apex end of the sleeve is in an abutting relationship and coterminal with one end of the tube and the base end of the sleeve is maintained substantially in concentric alignment with the tube at a substantially uniform standoff distance therefrom about the conical sleeve base perimeter;

an explosive charge disposed about the outside surface of the sleeve and extending substantially parallel to the axis of the tube; and means coupled to the explosive charge for initiating a detonation of the explosive charge at all points along the outside end surface of the charge substantially simultaneously whereby detonation is propagated uniformly in a direction parallel to the axis of the tube.

6. The apparatus as defined in claim 5 whereby the filler material is comprised of a core deposited in the tube by filling the portion of the tube with a liquid casting with a cohesive material having a substantially lower melting temperature than the melting temperature of the tube and permitting the casting to solidify inside the tube.

7. The apparatus as defined in claim 5 wherein the explosive charge has an annular end portion disposed in concentric coterminal relation with the apex of the sleeve and said one end of the tube and said means for initiating detonation comprises:

a booster explosive charge formed into a relatively thin circular disk having a detonation velocity substantially greater than the detonation velocity of the cylindrical explosive charge, the booster disk being concentrically aligned and positioned in overlapping relation with the annular end portion of the cylindrical charge; and a detonator concentrically disposed within the booster disk.

8. The apparatus as defined in claim 5 wherein said supporting means includes:

annular spacer means disposed between the inner surface of the base of the metal sleeve and the outer surface of the tube for maintaining a prescribed uniform stand-off distance between the sleeve base perimeter and tube; and annular support means positioned in substantially concentric alignment with the metal tube and below the base of the metal sleeve to provide axial support therefor.

9. A method for fabricating threads on an end of a cylindrical metal component, comprising:

disposing a truncated cone-shaped metal sleeve in overlapping relation to a cylindrical metal rod so that the apex of the sleeve is in abutting relationship and coterminal with one end of the rod and the base of the sleeve is maintained substantially in concentric alignment with the rod and a substantially uniform stand-off distance therefrom; about the conical sleeve base perimeter bonding the inside surface of the sleeve to the outside surface of an end portion of the rod by producing a high-energy, radially-directed impact of the sleeve against the end portion of the rod, the sleeve being impacted against the outside surface of the rod at a velocity of sufficient magnitude to cause the formation of a metallurgical bond at the interface therebetween; and machining a thread into the bonded sleeve by penetrating the sleeve with a machine tool.

10. The method as defined in claim 9 wherein the thread machining step is performed by penetrating the sleeve with a machine tool along a tapered path which runs into the rod.

11. The method according to claim 9 wherein said metal rod is a metal cylindrical tube having an axial flow passage therein and said method further includes the step of depositing in the metal tube within a portion of the tube to be bonded and that is adjacent to the truncated cone-shaped metal sleeve, a liquid casting of a cohesive material having a substantially lower melting temperature than the melting temperature of the metal tube and permitting the casting to solidify in situ prior to bonding the sleeve to the metal tube whereby the liquid casting supports the metal tube from collapsing during bonding.

12. The method as defined in claim 11 further including the step of heating the casting to its melting temperature and permitting it to flow out of the tube after the bonding step has been performed.

13. The method as defined in claim 9 wherein the high-energy collision is produced by a detonation of an explosive charge propagating uniformly around the metal sleeve and along the length of the tube in a direction substantially parallel to the axis of the tube.

14. The method as defined in claim 13 wherein the explosive charge is disposed around the perimeter of the metal sleeve, said explosive charge having an annular end portion disposed in concentric coterminal relation with said apex of said sleeve and said one end of said tube so that the detonation of the explosive charge is initiated substantially simultaneously at all points along the annular face thereof.

* * * * *

UNITED STATES PATENT AND TRADEMARK OFFICE
CERTIFICATE OF CORRECTION

PATENT NO. : 4,546,226
DATED : 8 October 1985
INVENTOR(S) : John F. Trembley

It is certified that error appears in the above-identified patent and that said Letters Patent are hereby corrected as shown below:

Code [75] Inventors : "John L. Hull, Huntington Valley, Pa." should be omitted.

Col. 7, line 40, "appended the" should read -- the appended --.

Signed and Sealed this

Twenty-fourth Day of December 1985

[SEAL]

Attest:

DONALD J. QUIGG

Attesting Officer        Commissioner of Patents and Trademarks

UNITED STATES PATENT AND TRADEMARK OFFICE
CERTIFICATE OF CORRECTION

PATENT NO. : 4,564,226
DATED : January 14, 1986
INVENTOR(S) : Alfred E. Doherty, Jr.

It is certified that error appears in the above-identified patent and that said Letters Patent is hereby corrected as shown below:

Column 4, line 67, "thickness" should be --thicknessess--.

Signed and Sealed this

Sixth Day of May 1986

[SEAL]

Attest:

DONALD J. QUIGG

Attesting Officer

Commissioner of Patents and Trademarks